United States Patent
Cheng et al.

(10) Patent No.: US 11,697,956 B1
(45) Date of Patent: Jul. 11, 2023

(54) HINGE

(71) Applicant: FOSITEK CORPORATION, New Taipei (TW)

(72) Inventors: Yan-Jiao Cheng, New Taipei (TW); Chun-Han Lin, New Taipei (TW); Percy Wong, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 17/829,889

(22) Filed: Jun. 1, 2022

(51) Int. Cl.
*E05D 11/08* (2006.01)
*E05D 3/02* (2006.01)
*E05D 5/02* (2006.01)

(52) U.S. Cl.
CPC .............. *E05D 11/082* (2013.01); *E05D 3/02* (2013.01); *E05D 5/02* (2013.01); *E05Y 2201/26* (2013.01); *E05Y 2900/606* (2013.01)

(58) Field of Classification Search
CPC ................. E05D 11/082; E05D 11/084; E05D 2011/085; E05D 3/02; E05D 5/02
USPC .................................................... 16/337, 342
See application file for complete search history.

(56) References Cited

U.S. PATENT DOCUMENTS

| | | | | |
|---|---|---|---|---|
| 5,896,622 A * | 4/1999 | Lu | ......................... | G06F 1/1681 16/337 |
| 5,950,281 A * | 9/1999 | Lu | ......................... | G06F 1/1616 16/337 |
| 6,085,388 A * | 7/2000 | Kaneko | .................. | G06F 1/1681 16/338 |
| 6,170,120 B1 * | 1/2001 | Lu | ......................... | G06F 1/1616 16/337 |
| 6,230,365 B1 * | 5/2001 | Lu | ......................... | G06F 1/1616 16/337 |
| 6,584,646 B2 * | 7/2003 | Fujita | .................... | G06F 1/1616 16/342 |
| 7,124,473 B2 * | 10/2006 | Lu | ......................... | G06F 1/1681 16/337 |
| 7,451,522 B2 * | 11/2008 | Lu | ......................... | G06F 1/1681 16/342 |
| 7,533,448 B2 * | 5/2009 | Chern | ................... | G06F 1/1681 16/342 |

(Continued)

FOREIGN PATENT DOCUMENTS

| | | |
|---|---|---|
| TW | M315363 U | 7/2007 |
| TW | M326332 U | 1/2008 |
| TW | M372961 U1 | 1/2010 |

*Primary Examiner* — Jeffrey O'Brien
(74) *Attorney, Agent, or Firm* — Chun-Ming Shih; HDLS IPR Services

(57) ABSTRACT

A hinge includes a rotating shaft, two pivoting parts, and a seat. The rotating shaft includes a friction section and a protruding section coaxially extending from the friction section. Each of the pivoting parts includes a connecting piece and a sleeve piece. Each sleeve piece is extended from an edge side of the corresponding connecting piece, and bent and wrapped to form a sleeve hole. Each sleeve piece is configured to be sleeved on the friction section, and the two sleeve pieces on the peripheral surface of the friction section are bent and wrapped in different directions respectively. The seat includes a shaft hole. The friction section and the sleeve pieces are jointly arranged in the shaft hole, the connecting piece is fixed on the seat, and the protruding section protrudes out of the seat.

8 Claims, 12 Drawing Sheets

(56) References Cited

U.S. PATENT DOCUMENTS

| | | | | |
|---|---|---|---|---|
| 7,584,525 B2* | 9/2009 | Chern | G06F 1/1616 | 16/386 |
| 7,690,084 B2* | 4/2010 | Lu | G06F 1/1681 | 16/382 |
| 7,707,689 B2* | 5/2010 | Kim | H04M 1/0216 | 16/342 |
| 8,091,179 B2* | 1/2012 | Wang | G06F 1/1616 | 16/338 |
| 8,230,554 B2* | 7/2012 | Chu | E05D 11/087 | 16/337 |
| 8,245,356 B2* | 8/2012 | Chu | G06F 1/1681 | 16/342 |
| 8,402,609 B2* | 3/2013 | Chien | E05D 11/1014 | 16/374 |
| 8,448,297 B2* | 5/2013 | Chen | E05D 11/10 | 16/342 |
| 10,324,500 B2* | 6/2019 | Schafer | G06F 1/1681 | |
| 10,533,358 B2* | 1/2020 | Naganuma | E05D 11/087 | |
| 10,809,772 B1* | 10/2020 | Wang | G06F 1/1681 | |
| 11,054,866 B2* | 7/2021 | Lin | H04M 1/022 | |
| 2006/0213030 A1* | 9/2006 | Lu | G06F 1/1616 | 16/221 |
| 2007/0101543 A1* | 5/2007 | Lu | G06F 1/1681 | 16/342 |
| 2007/0136996 A1* | 6/2007 | Chen | G06F 1/1616 | 16/342 |
| 2007/0169314 A1* | 7/2007 | Lee | G06F 1/1616 | 16/342 |
| 2008/0151477 A1* | 6/2008 | Chern | G06F 1/1616 | 16/342 |
| 2008/0151478 A1* | 6/2008 | Chern | G06F 1/1616 | 16/342 |
| 2008/0263823 A1* | 10/2008 | Lee | G06F 1/1616 | 16/277 |
| 2008/0263826 A1* | 10/2008 | Huang | G06F 1/1616 | 16/342 |
| 2009/0038116 A1* | 2/2009 | Hsu | E05D 11/082 | 16/240 |
| 2009/0070962 A1* | 3/2009 | Su | E05D 5/02 | 16/360 |
| 2009/0083943 A1* | 4/2009 | Chen | G06F 1/1681 | 16/342 |
| 2009/0293229 A1* | 12/2009 | Chiang | G06F 1/1616 | 16/342 |
| 2011/0154613 A1* | 6/2011 | Chang | E05D 3/02 | 16/273 |
| 2021/0277694 A1* | 9/2021 | Rivas | E05D 5/127 | |

* cited by examiner

HINGE

BACKGROUND

Technical Field

This disclosure relates to a hinge, and more particularly to a hinge that provides torsional resistance in both forward and reverse rotations.

Related Art

A foldable electronic device, such as a notebook computer, a foldable mobile phone or other electronic devices, connects the two bodies with a hinge, so that the angle between the two bodies is allowed to be changed from 0 degrees (overlapping each other) to nearly 360 degrees. Usually, the two bodies are an operation part placed on the desktop or held on the hand and a main display part. Generally, the user adjusts the included angle to an appropriate angle to view the main display part a comfortable position during operation.

The hinge has to provide appropriate torsional resistance to resist the weight of the main display part or the torsional force generated when the electronic device is shaken, so as to maintain the aforementioned included angle. An approach to provide torsional resistance is to dispose a sleeve piece bent and wrapped around the surface of the rotating shaft. The sleeve piece is arranged with the appropriate size to keep in contact with the surface of the rotating shaft and apply a certain pressure on the rotating shaft. The sleeve piece produces frictional force on the surface of the rotating shaft, thereby forming a frictional torque (torsional resistance) on the rotating shaft. When the rotating shaft rotates relative to the sleeve piece (or the sleeve piece connecting the device body rotates relative to the rotating shaft), the sleeve piece can be driven to be further pressed against the surface of the rotating shaft to increase the frictional torque (torsional resistance). However, the torsional resistance generated by this approach is directional. When the hinge rotates in reverse, the sleeve piece will loosen to reduce frictional torque, such that the torsional resistance provided by the hinge in forward rotation and reverse rotation is inconsistent, and even the torsional resistance is too low in the reverse rotation.

In addition, the sleeve piece is usually fixed to the seat only by means of interference, for example, by inserting a piece-shaped connecting part into a slit of the seat. Slits or other means of interference often tolerances that result in a gap between the interfering structure of the sleeve piece and the seat. Therefore, the sleeve piece will shake with the rotation of the rotating shaft, which will cause the tightly wrapped sleeve piece to loosen or even idling to reduce the frictional torque. Meanwhile, the connection between the sleeve piece and the seat will also cause the sleeve piece to collide with the seat during relative rotation process, causing the sleeve piece to be continuously impacted and reducing the life of the sleeve piece.

SUMMARY

In view of the above problems, the this disclosure proposes a hinge, which is a simple and a small, and able to provide appropriate torsional resistance in both forward and reverse rotations.

A hinge of this disclosure includes a rotating shaft, two pivoting parts, and a seat. The rotating shaft includes a friction section and a protruding section coaxially extending from the friction section. Each of the pivoting parts includes a connecting piece and a sleeve piece. Each sleeve piece is extended from an edge side of the corresponding connecting piece, and bent and wrapped to form a sleeve hole. Each sleeve piece is configured to be sleeved on the friction section, and the two sleeve pieces on the peripheral surface of the friction section are bent and wrapped in different directions respectively. The seat includes a shaft hole. The friction section and the sleeve pieces are jointly arranged in the shaft hole, the connecting piece is fixed on the seat, and the protruding section protrudes out of the seat.

In at least one embodiment, a cross-section of the protruding section is smaller than a cross-section of the friction section, and the protruding section is configured to be non-circular.

In at least one embodiment, a surface of the protruding section is provided with knurls arranged in parallel to an axial direction of the rotating shaft, In at least one embodiment, a cross-section of each of the sleeve pieces is C-shaped, and a front edge of each of the sleeve pieces does not contact the corresponding connecting piece.

In at least one embodiment, the seat includes an alignment slit, the alignment slit is formed on an inner surface of the shaft hole and extending in parallel to an axial direction of the shaft hole, and each of the connecting pieces is configured to embed the alignment slit to fix the corresponding connecting piece to the seat.

In at least one embodiment, the seat is provided with two fixing holes penetrating two sides of the seat and in perpendicular to the axial direction of the shaft hole, and each of the fixing holes communicates with the alignment slit; each of the connecting pieces is provided with a positioning hole respectively arranged coaxially with one of the fixing holes; and the hinge further comprises two fixing pins respectively passing one of the two fixing holes and the corresponding positioning hole.

In at least one embodiment, each of the fixing holes includes an upper section corresponding to one side of the alignment slit and a lower section corresponding to the other side of the alignment slit, and a cross-section of the upper section is larger than a cross-section of the lower section such that a stepped segment is formed at a middle of each of the fixing holes, and the stepped segment corresponds to the alignment slit; and each of the fixing pins includes a fixing section and a penetrating section, and a cross-section of the fixing section is larger than a cross-section of the penetrating section; the penetrating section is configured to insert into one of the fixing holes via the corresponding upper section and enter the corresponding lower section, the fixing section is configured to enter the corresponding lower section and press the connecting piece onto the stepped segment, and the penetrating section is configured to be fixed in the lower section to fix the fixing section and the connecting piece.

In at least one embodiment, and the hinge further includes a rotating holder fixedly connected to the protruding section and configured to rotate with respect to the seat, so as to drive the rotating shaft to rotate with respect to the seat in the shaft hole.

In at least one embodiment, the protruding section is configured to be non-circular; and the rotating holder further includes an installation hole, The cross-section of at least a part of the installation hole is non-circular and match the cross-section of the protruding section, and the protruding section is configured to insert into the installation hole to form a fixed connection.

In at least one embodiment, and the rotating holder further includes an installation hole, a surface of the protruding section is provided with knurls arranged in parallel to an axial direction of the rotating shaft or the surface of the protruding section is provided with concave and convex structures, and the knurls or the concave and convex structures are configured to allow the protruding section to be fixed in the installation hole in a tight-fit manner.

In at least one embodiment, parts of the seat corresponding to each of the sleeve pieces are partially hollowed out.

Based on the above approach, the hinge of this disclosure provides torsional resistance in both forward and reverse rotations, and the torsional resistance in the two directions can be adjusted through the configuration of the two sleeve pieces to provide similar torsional forces or a required torsional forces proportional relationship. The hinge of this disclosure is simple and small, so that a size of the hinge can be effectively reduced to facilitate the application to small and thin electronic devices. In addition, in at least one embodiment, the connecting piece is fixed to the seat through the fixing pins, and there is no gap between the seat and the connecting piece due to the tolerance of the parts. Therefore, during the operation of the hinge, the connecting piece will not collide with the seat, which increases the service life of the connecting piece, thereby increasing the service life of the hinge.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
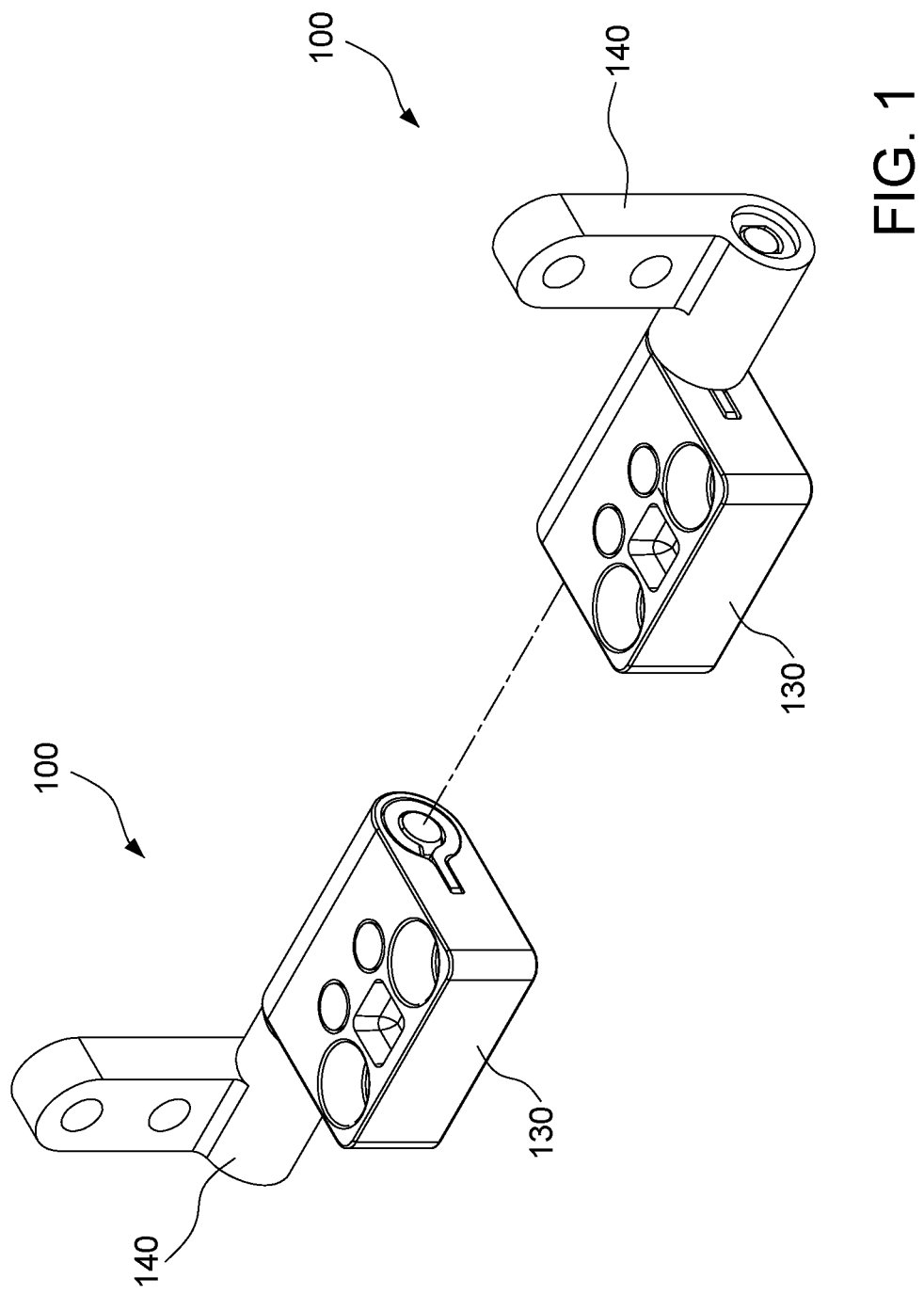
FIG. 1 is a three-dimensional view of paired hinges according to an embodiment of this disclosure.
Figure 2:
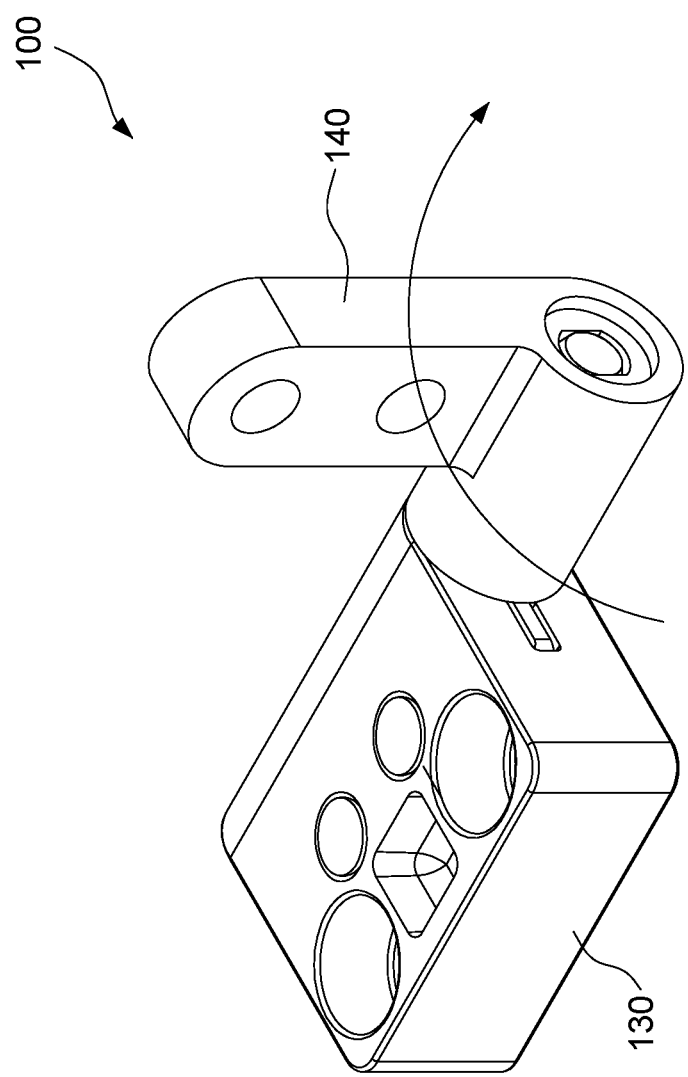
FIG. 2 is a three-dimensional view of a hinge according to the embodiment of this disclosure.
Figure 3:
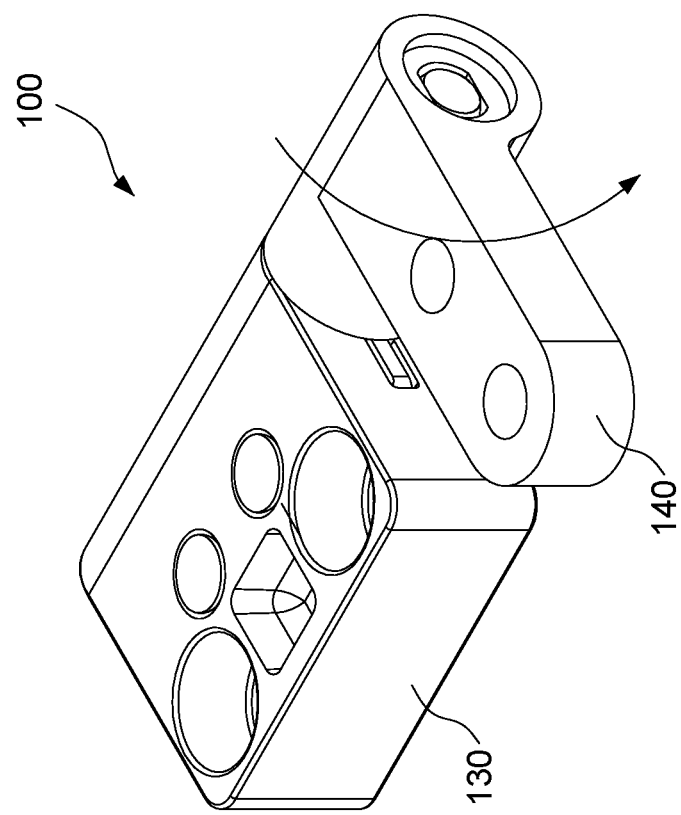
FIG. 3 is another three-dimensional view of the hinge according to the embodiment of this disclosure.

As shown in FIG. 1, FIG. 2, and FIG. 3, a hinge 100 according to an embodiment of this disclosure include a rotating shaft 110, two pivoting parts 120, a seat 130, and a rotating holder 140. As shown in FIG. 1, FIG. 2, and FIG. 3, the hinges 100 can be provided individually or in pairs on the same axis. The hinge 100 is connected to connect the two electronic bodies, to allow the two electronic bodies to rotate with respect to each other to be folded together or opened. And the two electronic bodies constitute a foldable electronic device. The seat 130 and the rotating holder 140 are respectively connected to one of the two electronic bodies, and the hinge 100 is able to provide appropriate torque between the two bodies when opening or folding. The paired hinges 100 can be identical components, as shown in FIG. 1. The two hinges 100 may also be mirrored and disposed on the same axis, as shown in FIG. 2. Certainly, the two electronic bodies are not limited to be connected by two hinges 100, and may be connected by more than two hinges 100.

Figure 4:
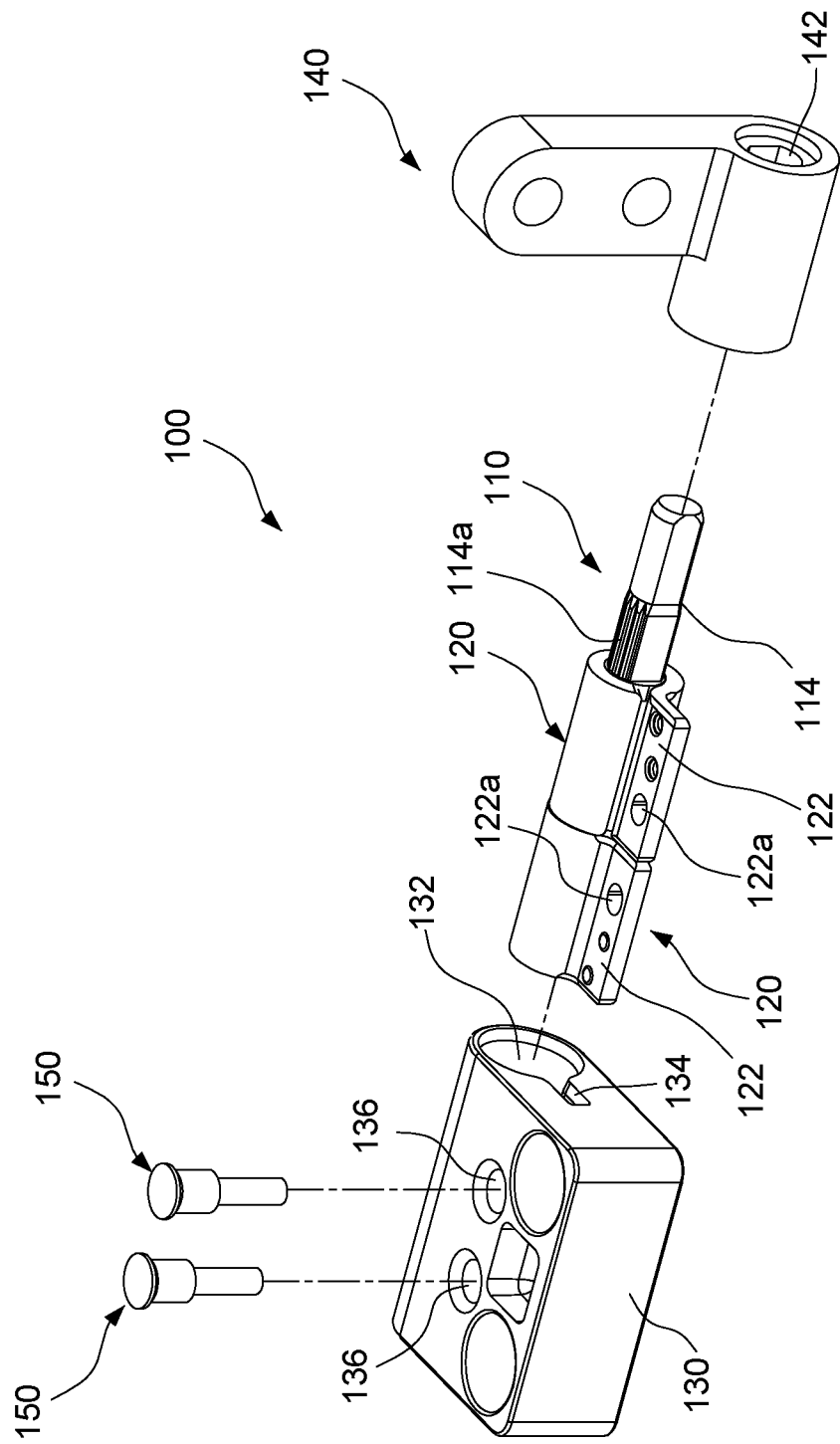
FIG. 4 is an exploded view of the hinge according to the embodiment of this disclosure.
Figure 5:
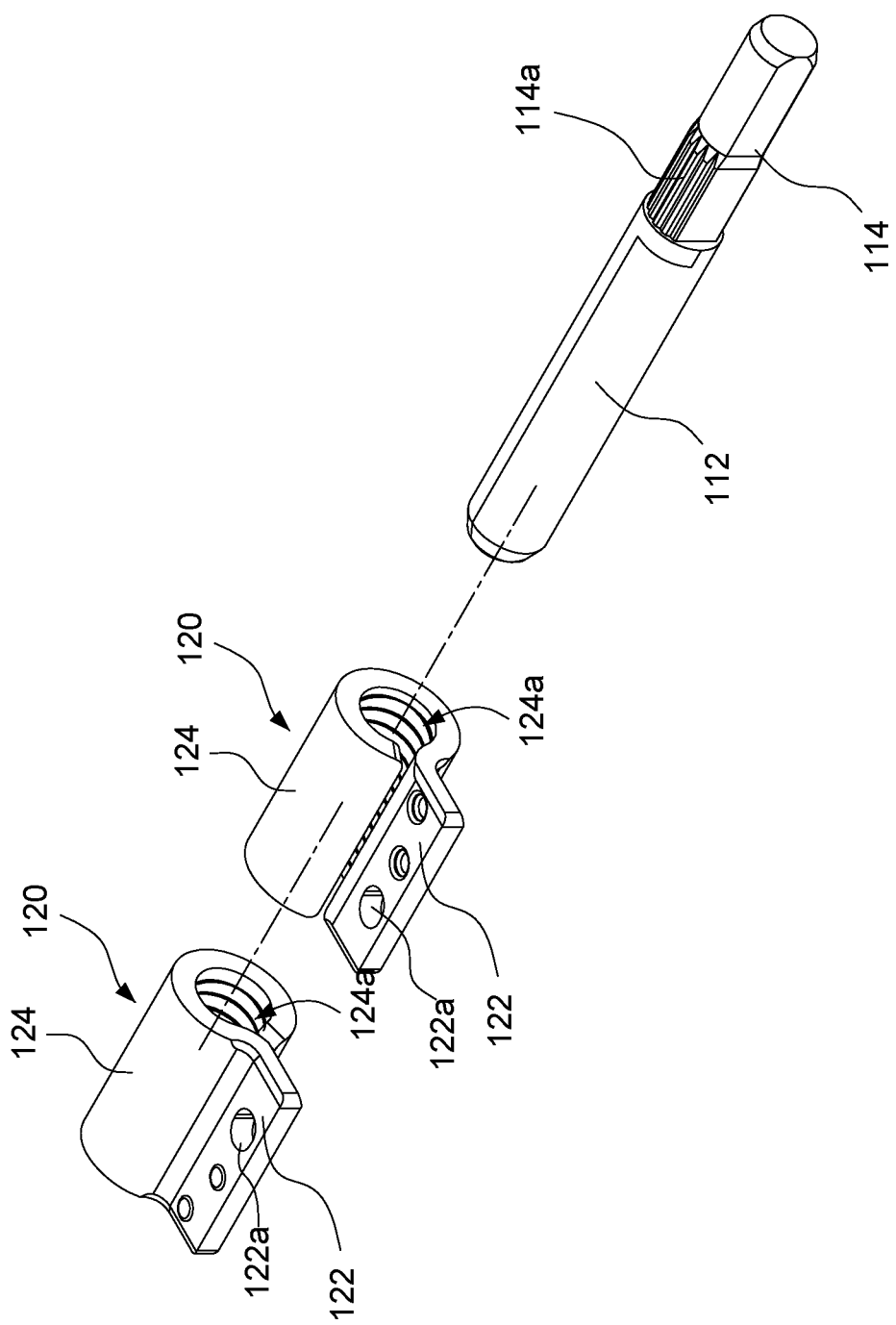
FIG. 5 is a three-dimensional view of two pivoting parts and rotating shaft according to the embodiment of this disclosure.

As shown in FIG. 4 and FIG. 5, the rotating shaft 110 can be made of a material with high rigidity, such as stainless steel. The rotating shaft 110 includes a friction section 112 and a protruding section 114 coaxially extending from the friction section 112. The cross-section of the friction section 112 is substantially circular. A cross-section of the protruding section 114 is smaller than a cross-section of the friction section 112, and the protruding section 114 is configured to be non-circular. In one specific embodiment, the cross-section of the protruding section 114 is nearly rectangular, and a surface of the protruding section 114 is provided with knurls 114a arranged in parallel to an axial direction of the rotating shaft 110 or concave and convex structures. Or the cross-section of the protruding section 114 is approximately circular, and a surface of the protruding section 114 is provided with knurls 114a arranged in parallel to an axial direction of the rotating shaft 110 or concave and convex structures, such that the cross-section is substantially non-circular.

As shown in FIG. 4 and FIG. 5, each of the pivot members 120 includes a connecting piece 122 and a sleeve piece 124 extending from the connecting piece 122. The connecting piece 122 is substantially in the form of a plate. Each sleeve piece 124 is extended from an edge side of the corresponding connecting piece 122, and bent and wrapped to form a sleeve hole 124a. And a front edge of each of the sleeve pieces 124 does not contact the corresponding connecting piece 122. That is, the cross-section of each of the sleeve pieces 124 is substantially C-shaped, the inner peripheral surface of the sleeve hole 124a is not completely enclosed, instead a slit is formed between the connection between the sleeve piece 124 and the connecting piece 122.

Figure 6:
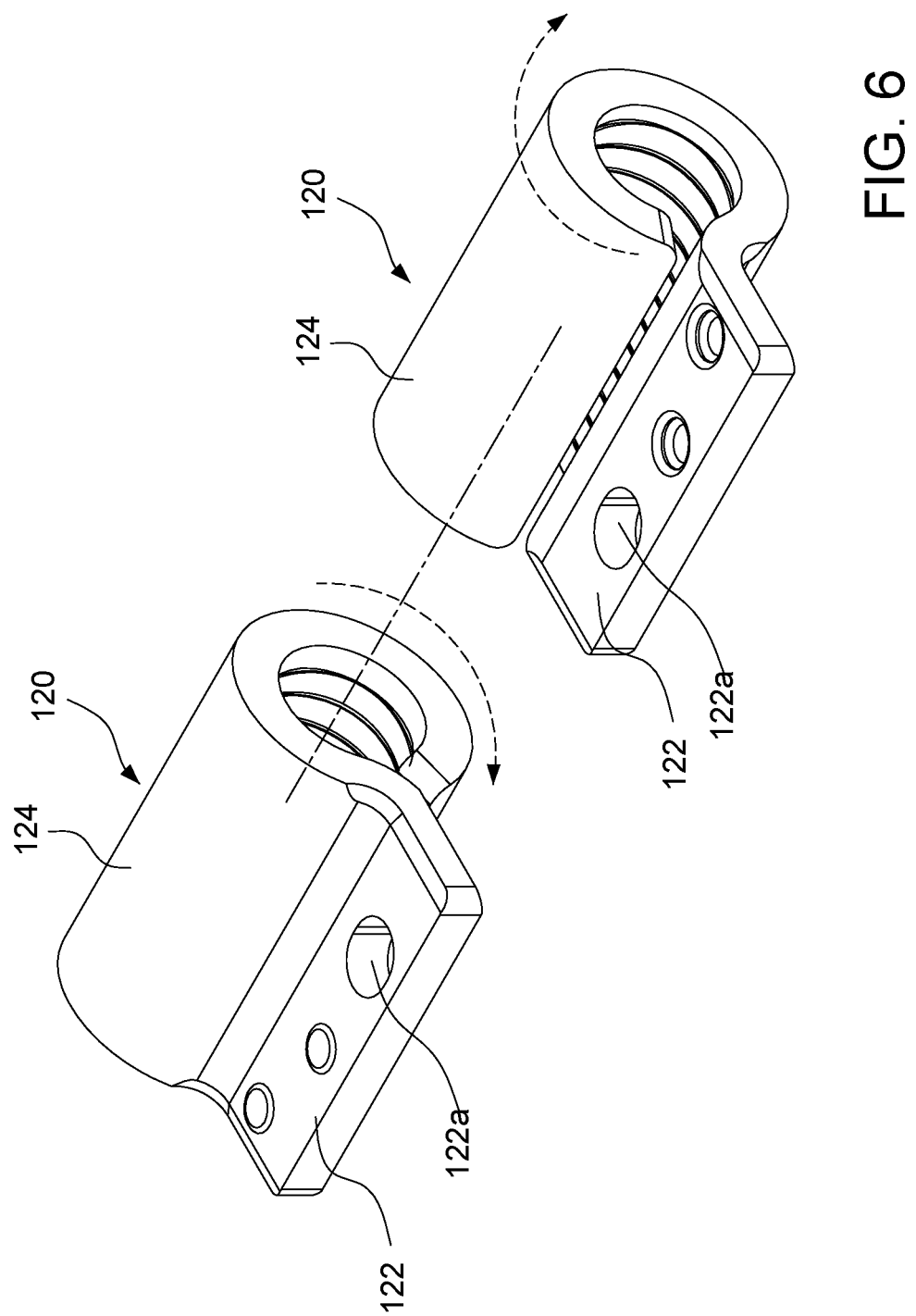
FIG. 6 is a three-dimensional view of the two pivoting parts.

As shown in FIG. 4, FIG. 5, and FIG. 6, each sleeve piece 124 is configured to be sleeved on the friction section 112 of the rotating shaft 110, and the two sleeve pieces 124 on the peripheral surface of the friction section 112 are bent and wrapped in different directions respectively. In other words, the two sleeve pieces 124 are sleeved on the friction section 112 in opposite directions to each other. Specifically, the sleeve piece 124 is only rotatably sleeved on the rotating shaft 110, and there is no other fixed connection relationship between the sleeve piece 124 and the rotating shaft 110. When the sleeve piece 124 is not installed, the cross-section of the sleeve hole 124a may be smaller than the cross-section of the friction section 112. After the sleeve piece 124 is sleeved on the friction section 112 of the rotating shaft 110, the sleeve piece 124 is stretched and elastically deformed, and keeps in contact with the friction section 112, such that the sleeve piece 124 exerts pressure on the friction section 112 to generate a frictional force, thereby forming a frictional torque (torsional resistance) on the rotating shaft 110.

Figure 7:
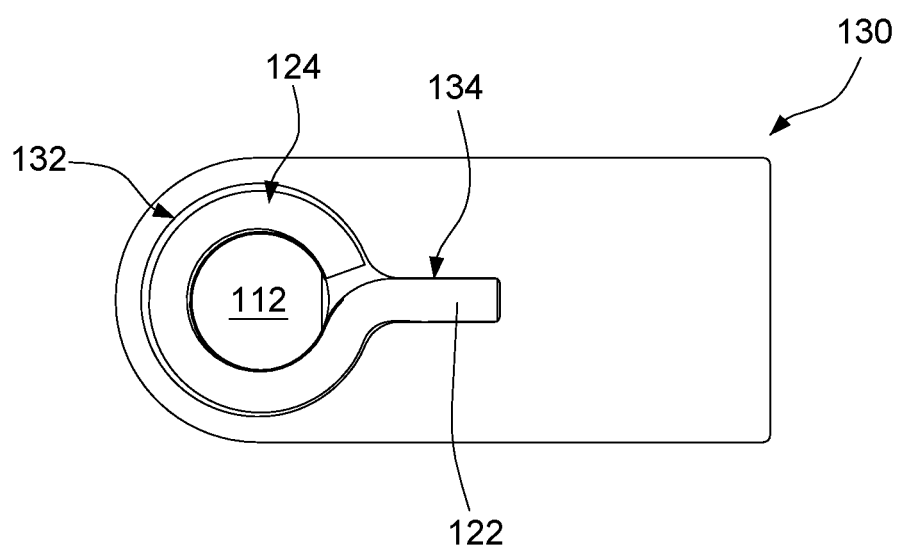
FIG. 7 is a side view of a seat, the pivoting parts and a friction section according to the embodiment of this disclosure.

As shown in FIG. 4 and FIG. 7, the seat 130 includes a shaft hole 132. The friction section 112 of the rotating shaft 110 and the two sleeve pieces 124 are jointly arranged in the shaft hole 132, the connecting piece 122 is fixed on the seat 130, and the protruding section 114 protrudes out of the seat 130.

As shown in FIG. 4 and FIG. 7, the seat 130 further includes an alignment slit 134; the alignment slit 134 is formed on an inner surface of the shaft hole 132 and extending in parallel to an axial direction of the shaft hole 132. Meanwhile, At least one end of the alignment slit 134 is open at the opening of the shaft hole 132. Each of the connecting pieces 122 is configured to embed the alignment slit 134 to fix the connecting piece 122 to the seat 130 to limit the rotation and linear movement of the sleeve piece 124, such that the sleeve piece 124 does not rotate or linearly move with respect to the seat 130 in the shaft hole 132.

Figure 8:
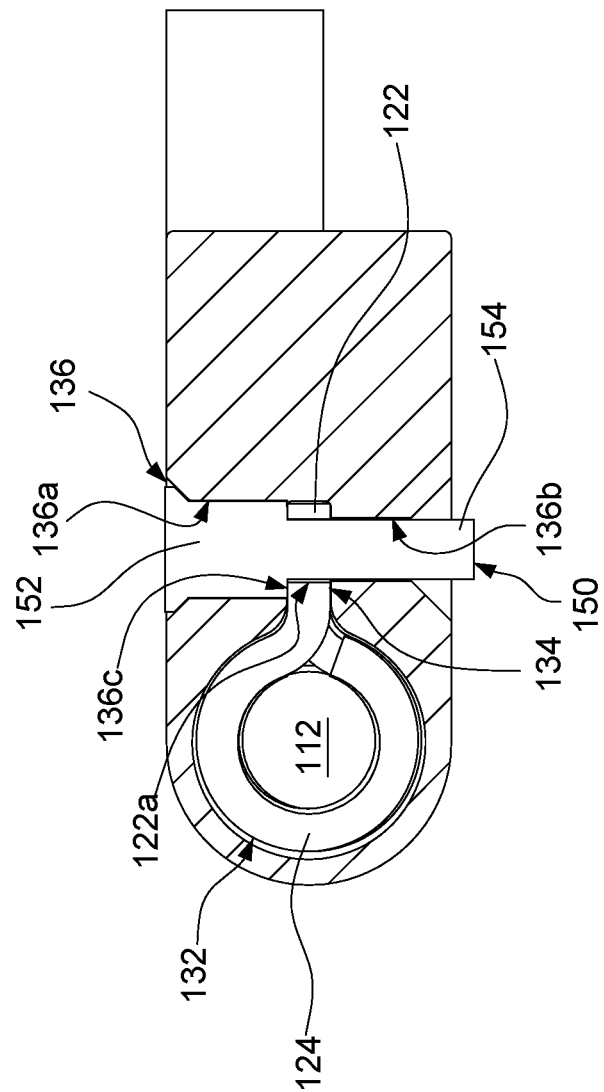
FIG. 8 is a cross-sectional view of the seat, the pivoting parts and the friction section according to the embodiment of this disclosure.

As shown in FIG. 4, FIG. 6 and FIG. 8, the seat 130 is also provided with two fixing holes 136 penetrating two sides of the seat 130 and in perpendicular to the axial direction of the shaft hole 132. Each of the fixing holes 136 communicates with the alignment slit 134. Each of the fixing holes 136 includes an upper section 136a corresponding to one side of the alignment slit 134 and a lower section 136b corresponding to the other side of the alignment slit 134. A cross-section of the upper section 136a is larger than a cross-section of the lower section 136b, such that a stepped segment 136c is formed at a middle of each of the fixing holes 136, and the stepped segment 136c corresponds to the alignment slit 134. Each of the connecting pieces 122 is provided with a positioning hole 122a respectively arranged coaxially with one of the fixing holes 136.

As shown in FIG. 4, FIG. 6 and FIG. 8, the hinge 100 further comprises two fixing pins 150. Each of the fixing pins 150 includes a fixing section 152 and a penetrating section 154, and a cross-section of the fixing section 152 is larger than a cross-section of the penetrating section 154. The penetrating section 154 of each fixing pin 150 is inserted into one of the fixing holes 136 via the corresponding upper section 136a, and then the penetrating section 154 passes through the positioning hole 122a to enter the corresponding lower section 136b. The fixing section 152 enters the lower section 136b, to allow the fixing section 152 to press the connecting piece 122 on the stepped segment 136c with a cross-section. The fixing section 152 is fixed in the upper section 136a, and the penetrating section 154 is fixed in the lower section 136b. The fixing section 152 is fixed on the upper section 136a by tight fitting, and the penetrating section 154 is fixed on the lower section 136b by screwing. Taking the direction shown in FIG. 8 as an illustration, the fixing section 152 is fixed in the upper section 136a to prohibit the axial displacement of the fixing pin 150 (i.e., the upper and lower displacement in FIG. 8). The penetrating section 154 is fixed on the lower section 136b to prohibit the vertical displacement of the fixing section 154 and the connecting piece 122. The connecting piece 122 can maintain the state of being pressed on the stepped segment 136c, and will not shake up and down as shown in the drawings and collide with the seat 130. Therefore, the connecting piece 122 can be tightly fixed to the alignment slit 134 without shaking due to factors such as tolerance and clearance.

Figure 9:
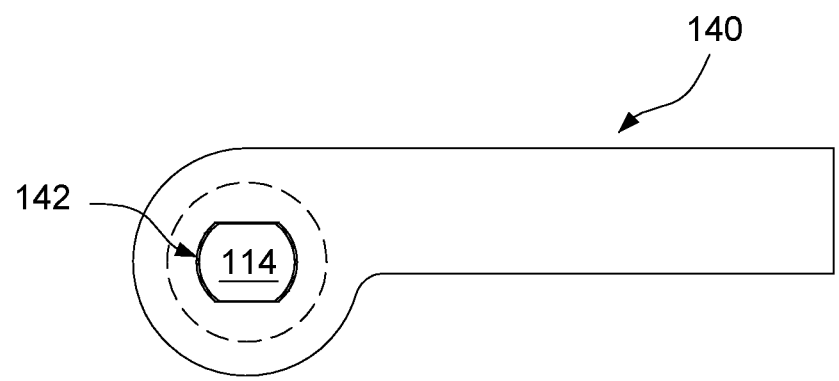
FIG. 9 is a side view of a rotating holder and the protruding section, illustrating the connection between the rotating holder and the protruding section.

As shown in FIG. 2, FIG. 4 and FIG. 9, The rotating holder 140 is configured to be fixedly connected to the protruding section 114 of the rotating shaft 110, so that the rotating holder 140 is able to rotate with respect to the seat 130 and drive the rotating shaft 110 to rotate with respect to the seat 130 in the shaft hole 132. The rotating holder 140 further includes an installation hole 142, The cross-section of at least a part of the installation hole 142 is non-circular and is matched with the protruding section 114 of the rotating shaft 110. Therefore, the protruding section 114 is able to insert into the installation hole 142 to form a fixed connection, such that the rotating holder 140 is prevented from idling relative to the rotating shaft 110. In addition, The knurls 114a or the concave and convex structures can be used to make the protruding section 114 fit in the installation hole 142 in a tight-fitting manner, such that the rotating holder 140 is prevented from falling off from the rotating shaft 110.

Furthermore, the seat 130 and the rotating holder 140 are respectively provided with openings for passing through fixing elements such as screws and rivets, to respectively fix the seat 130 and the rotating holder 140 to the two electronic bodies, such that the two electronic bodies are allowed to rotate with respect to each other to be folded together or opened. The rotating holder 140 can be omitted, and the protruding section 114 of the rotating shaft 110 is directly connected to one of the two electronic bodies. At this time, the installation holes 142 are provided on this electronic body.

Figure 11:
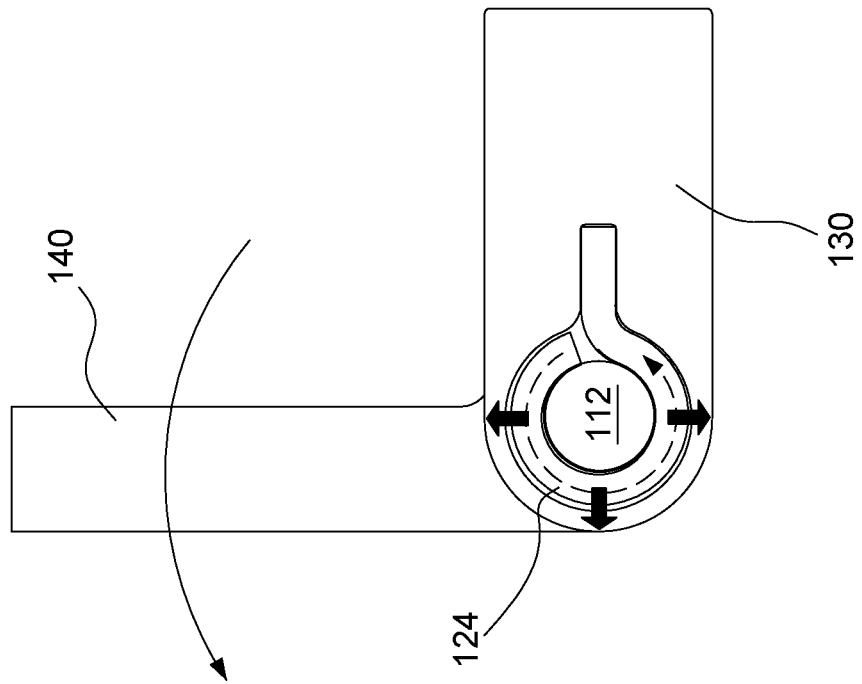
FIG. 10 and FIG. 11 are side views of the pivoting part, the rotating holder and the rotating shaft.
Figure 10:
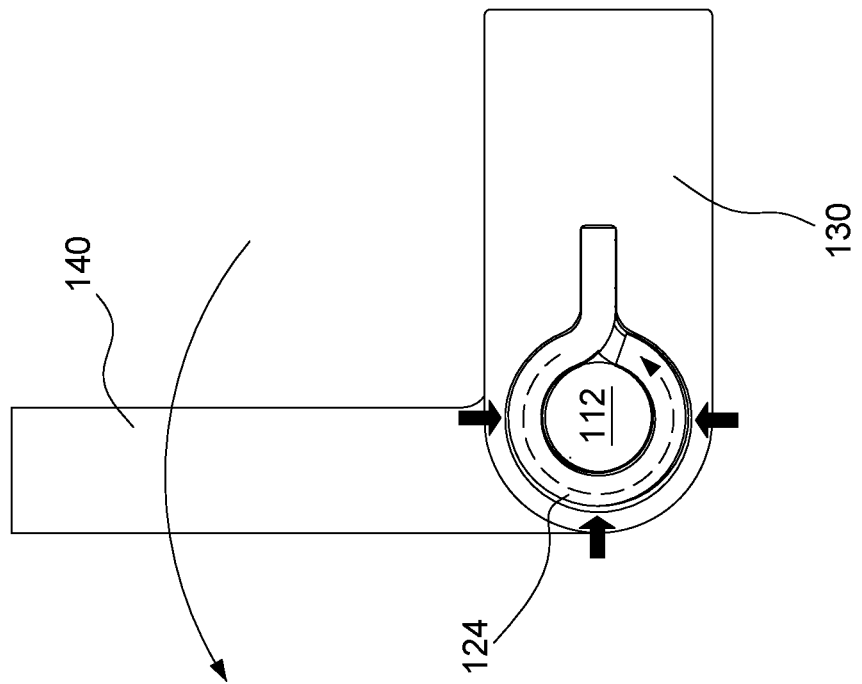

Referring to FIG. 10 and FIG. 11, the two sleeve pieces 124 are sleeved on the friction section 112 in opposite directions to each other, and the rotating holder 140 drives the rotating shaft 110 to turn counterclockwise. As shown in the drawings, the two sleeve pieces 124 extend in opposite directions to each other to be sleeved on the friction section 112.

As shown in FIG. 10, When the rotating holder 140 drives the rotating shaft 110 to turn counterclockwise, the rotation direction of the friction section 112 matches the extension direction of the sleeve piece 124 in FIG. 10, the sleeve piece 124 is driven to further tightly wind the friction section 112, and the pressure of the sleeve piece 124 applied on the friction section 112 raises, thereby increasing the frictional torque. That is, at this time, the torsional resistance provided by the sleeve piece 124 of FIG. 10 increases.

As shown in FIG. 11, on the contrary, the rotation direction of the friction section 112 is opposite to the extension direction of the sleeve piece 124 in FIG. 11, this sleeve piece 124 is driven and loosened, and the pressure of the sleeve piece 124 on the friction section 112 reduces, thereby reducing the frictional torque. That is, at this time, the torsional resistance provided by the sleeve piece 124 of FIG. 11 decreases.

In this disclosure, the fixing pin 150 fixes the connecting piece 122. The connecting piece 122 can be tightly fixed to the alignment slit 134 without shaking due to factors such as tolerance and clearance. Therefore, it can be avoided that the sleeve piece 124 on the right side in FIG. 10 changes from a state of tightly winding and pressing to a released state due to shaking, and a good torsional resistance is maintained.

Figure 13:
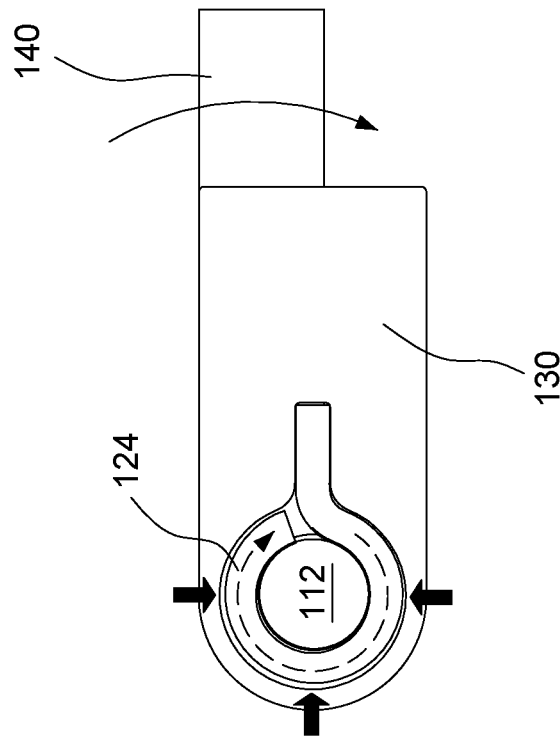
FIG. 12 and FIG. 13 are side views of the pivoting part, the rotating holder and the rotating shaft.
Figure 12:
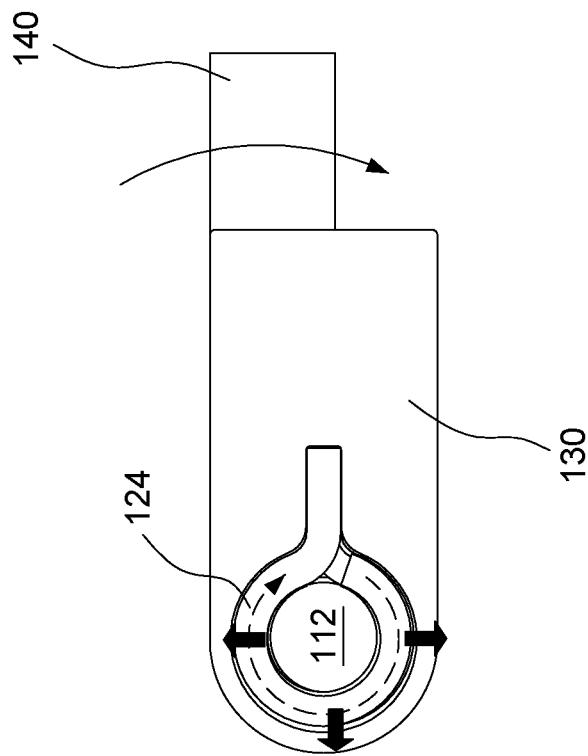

Referring to FIG. 12 and FIG. 13, the two sleeve pieces 124 are sleeved on the friction section 112 in opposite directions to each other, and the rotating holder 140 drives the rotating shaft 110 to turn clockwise. As shown in the drawings, the two sleeve pieces 124 extend in opposite directions to each other to be sleeved on the friction section 112.

As shown in FIG. 12, When the rotating holder 140 drives the rotating shaft 110 to turn clockwise, the rotation direction of the friction section 112 is opposite to the extension direction of the sleeve piece 124 in FIG. 13, and the sleeve piece 124 is driven and loosened, and the pressure of the sleeve piece 124 on the friction section 112 reduces, thereby reducing the frictional torque. That is, at this time, the torsional resistance provided by the sleeve piece 124 of FIG. 12 decreases.

As shown in FIG. 13, on the contrary,

The rotation direction of the friction section 112 matches the extension direction of the sleeve piece 124 in FIG. 13, the sleeve piece 124 is driven to further tightly wind the friction section 112, and the pressure of the sleeve piece 124 applied on the friction section 112 raises, thereby increasing the frictional torque. That is, at this time, the torsional resistance provided by the sleeve piece 124 of FIG. 13 decreases.

As shown in FIG. 10 to FIG. 13, the two sleeve pieces 124 are sleeved on the rotating shaft 110 in opposite directions to each other, the two sleeve pieces are respectively loosened and pressed against the rotating shaft 110 when the rotating shaft 110 turns in any direction, thereby generating steady torsional force on the rotating shaft 110. The frictional torque is applied onto the rotating shaft 110 when rotating shaft 110 rotates in the forward and reverse directions. The two sleeve pieces 124 providing the frictional torque can be identical, such that the torsional resistance of the rotating shaft 110 may be similar when the rotating shaft 110 rotates in the forward direction and in the reverse direction. In different embodiments, the rotating shaft 110 needs to bear different frictional torques during forward and reverse rotations, it is only necessary to change one of the two sleeve pieces 124 to have different sizes or configurations to obtain different torsional resistances.

Figure 14:
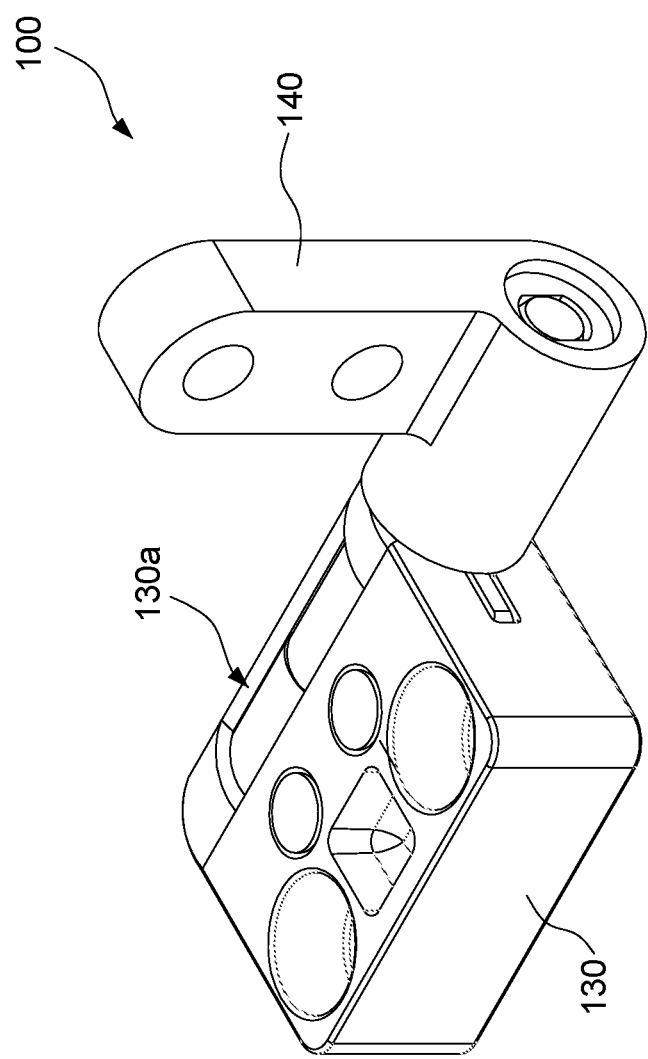
FIG. 14 is a three-dimensional view of a hinge according to another embodiment of this disclosure.

As shown in FIG. 14, Friction or tight-fitting are not required between the sleeve pieces 124 and the seat 130. In different embodiments, a part of the seat 130 corresponding to the sleeve piece 124 may be provided with a partial hollow structure 130a.

Based on the above approach, the hinge 100 of this disclosure provides torsional resistance in both forward and reverse rotations, and the torsional resistance in the two directions can be adjusted through the configuration of the two sleeve pieces 124 to provide similar torsional forces or a required torsional forces proportional relationship. The hinge 10 of this disclosure is simple and small, so that a size of the hinge can be effectively reduced to facilitate the application to small and thin electronic devices. In addition, in at least one embodiment, the pivoting part 120 is fixed to the seat 130 via the fixing pin 150 and there is no gap between the seat 130 and the connecting piece 122 of the pivoting part 120 due to the tolerance of the parts. During the operation of the hinge 100, the pivoting part 120 will not collide with the seat 130, which increases the service life of the pivoting part, thereby increasing the service life of the hinge 100.

What is claimed is:

1. A hinge, comprising:
a rotating shaft, including a friction section and a protruding section coaxially extending from the friction section;
two pivoting parts, respectively including a connecting piece and a sleeve piece; wherein each of the sleeve pieces is extended from an edge side of the corresponding connecting piece, and bent and wrapped to form a sleeve hole; each of the sleeve pieces is configured to be sleeved on the friction section, and the two sleeve pieces on a peripheral surface of the friction section are bent and wrapped in different directions respectively;
a seat, including a shaft hole; wherein the friction section and the sleeve pieces are jointly arranged in the shaft hole, each connecting piece is fixed on the seat, and the protruding section protrudes out of the seat;
wherein the seat includes an alignment slit, the alignment slit is formed on an inner surface of the shaft hole and extending in parallel to an axial direction of the shaft hole, and each of the connecting pieces is configured to embed in the alignment slit to fix the corresponding connecting piece to the seat;
wherein the seat is provided with two fixing holes penetrating two sides of the seat and in perpendicular to the axial direction of the shaft hole, and each of the fixing holes communicates with the alignment slit; each of the connecting pieces is provided with a positioning hole respectively arranged coaxially with one of the fixing holes; and the hinge further comprises two fixing pins respectively passing one of the two fixing holes and the corresponding positioning hole;
wherein each of the fixing holes includes an upper section corresponding to one side of the alignment slit and a lower section corresponding to the other side of the alignment slit, and a cross-section of the upper section is larger than a cross-section of the lower section such that a stepped segment is formed at a middle of each of the fixing holes, and the stepped segment corresponds to the alignment slit; and
each of the fixing pins includes a fixing section and a penetrating section, and a cross-section of the fixing section is larger than a cross-section of the penetrating section; the penetrating section is configured to insert into one of the fixing holes via the corresponding upper section and enter the corresponding lower section, the fixing section is configured to enter the corresponding upper section and press the connecting piece onto the stepped segment, and the penetrating section is configured to be fixed in the lower section to fix the fixing section and the connecting piece.

2. The hinge as claimed in claim 1, wherein a cross-section of the protruding section is smaller than a cross-section of the friction section, and the protruding section is non-circular.

3. The hinge as claimed in claim 1, wherein a surface of the protruding section is provided with knurls arranged in parallel to an axial direction of the rotating shaft, or the surface of the protruding section is provided with concave and convex structures.

4. The hinge as claimed in claim 1, wherein a cross-section of each of the sleeve pieces is C-shaped, and a front edge of each of the sleeve pieces does not contact the corresponding connecting piece.

5. The hinge as claimed in claim 1, further comprising a rotating holder, fixedly connected to the protruding section and configured to rotate with respect to the seat, so as to drive the rotating shaft to rotate with respect to the seat in the shaft hole.

6. The hinge as claimed in claim 5, wherein the protruding section is non-circular; and the rotating holder further includes an installation hole, the cross-section of at least a part of the installation hole is non-circular and matches the cross-section of the protruding section, and the protruding section is configured to insert into the installation hole to form a fixed connection.

7. The hinge as claimed in claim 5, wherein the rotating holder further includes an installation hole, a surface of the protruding section is provided with knurls arranged in parallel to an axial direction of the rotating shaft or the surface of the protruding section is provided with concave and convex structures, and the knurls or the concave and convex structures are configured to allow the protruding section to be fixed in the installation hole in a tight-fit manner.

8. The hinge as claimed in claim 1, wherein parts of the seat corresponding to each of the sleeve pieces are partially hollowed out.

\* \* \* \* \*